(12) United States Patent
Kortum et al.

(10) Patent No.: US 7,565,430 B2
(45) Date of Patent: Jul. 21, 2009

(54) FIREWALL SWITCHING SYSTEM FOR COMMUNICATION SYSTEM APPLICATIONS

(75) Inventors: Philip Kortum, Austin, TX (US); Marc A. Sullivan, Austin, TX (US)

(73) Assignee: AT&T Intellectual Property I, L.P., Reno, NV (US)

(*) Notice: Subject to any disclaimer, the term of this patent is extended or adjusted under 35 U.S.C. 154(b) by 866 days.

(21) Appl. No.: 10/605,474

(22) Filed: Oct. 1, 2003

(65) Prior Publication Data

US 2005/0076121 A1  Apr. 7, 2005

(51) Int. Cl.
*G06F 15/173* (2006.01)
*G06F 15/16* (2006.01)

(52) U.S. Cl. .................. 709/225; 709/229; 709/232

(58) Field of Classification Search .............. 709/217, 709/219, 220, 225, 228, 203, 212, 229, 232
See application file for complete search history.

(56) References Cited

U.S. PATENT DOCUMENTS

| | | | | |
|---|---|---|---|---|
| 5,343,471 | A * | 8/1994 | Cassagnol | 370/401 |
| 5,720,035 | A * | 2/1998 | Allegre et al. | 709/225 |
| 5,740,375 | A * | 4/1998 | Dunne et al. | 709/238 |
| 5,930,792 | A * | 7/1999 | Polcyn | 707/9 |
| 5,987,611 | A * | 11/1999 | Freund | 726/4 |
| 5,991,878 | A * | 11/1999 | McDonough et al. | 726/9 |
| 6,041,412 | A * | 3/2000 | Timson et al. | 726/3 |
| 6,047,322 | A * | 4/2000 | Vaid et al. | 709/224 |
| 6,052,788 | A * | 4/2000 | Wesinger et al. | 726/11 |
| 6,065,055 | A | 5/2000 | Hughes et al. | |
| 6,321,334 | B1 * | 11/2001 | Jerger et al. | 726/1 |
| 6,389,472 | B1 | 5/2002 | Hughes et al. | |
| 6,681,243 | B1 * | 1/2004 | Putzolu et al. | 709/202 |
| 6,708,205 | B2 | 3/2004 | Sheldon et al. | |
| 6,751,738 | B2 * | 6/2004 | Wesinger et al. | 726/14 |
| 6,804,783 | B1 * | 10/2004 | Wesinger et al. | 726/11 |
| 6,832,321 | B1 | 12/2004 | Barrett | |
| 6,990,591 | B1 * | 1/2006 | Pearson | 726/22 |
| 7,013,482 | B1 * | 3/2006 | Krumel | 726/13 |
| 7,127,738 | B1 * | 10/2006 | Jackson | 439/620.01 |
| 7,155,502 | B1 * | 12/2006 | Galloway et al. | 709/223 |
| 7,162,742 | B1 * | 1/2007 | Flowers et al. | 726/25 |
| 7,181,769 | B1 * | 2/2007 | Keanini et al. | 726/23 |
| 7,200,105 | B1 * | 4/2007 | Milliken et al. | 370/216 |
| 7,222,366 | B2 * | 5/2007 | Bruton et al. | 726/23 |
| 2002/0037797 | A1 * | 3/2002 | Enomoto et al. | 349/156 |
| 2002/0083331 | A1 | 6/2002 | Krumel | |
| 2003/0046586 | A1 * | 3/2003 | Bheemarasetti et al. | 713/201 |

\* cited by examiner

*Primary Examiner*—Ario Etienne
*Assistant Examiner*—Sargon N Nano
(74) *Attorney, Agent, or Firm*—Toler Law Group

(57) ABSTRACT

A material content setting adjustment system (10) includes a computer (16) and an interface (14). The interface (14) facilitates communication between the computer (16) and a network (18). An interface mode adjustment switch (12) has multiple physical operating mode positions. A controller (30) is coupled to the interface mode adjustment switch (12). The controller (30) selectively determines passage of material content between the computer (16) and the interface (14) in response to position of the interface mode adjustment switch (12).

21 Claims, 5 Drawing Sheets

FIREWALL SWITCHING SYSTEM FOR COMMUNICATION SYSTEM APPLICATIONS

BACKGROUND OF INVENTION

The present invention relates generally to systems and methods of identifying and preventing passage of undesired content in a communication signal. More particularly, the present invention is related to a system and method of adjusting operating mode of a firewall protection system and the passage of material content therethrough.

The Internet is a vast collection of resources from around the world. Computers that have access to the Internet can send and receive data to and from millions of computers via various communication networks. Large amounts of data and information are available and easily accessible. In many situations, it is desirable to limit the amount or type of information that a computer can retrieve and receive. For example, in a business, school, or even a personal computer setting environment the retrieval of pornographic or violent material content may be undesirable. In another example, content may be retrieved by a computer from an unknown or unreliable source that may contain spam, such as advertisements or junk mail, or viruses, which can be annoying or negatively affect system performance.

Various firewalls have been developed to prevent access to or reception of undesirable content. Firewalls were once only considered important for large corporations and network providers. However, with the advent of consumer broadband and the proliferation of automated hacking tools, the use of protective firewall technologies has become important to small businesses and even the average individual user.

Broadband users tend to maintain connection to the Internet or to the World Wide Web (WWW) for extended and continuous periods of time, as opposed to dial-up users, which tend to be session based. As a result of the continuous connectivity, the broadband user is more susceptible and vulnerable to hackers seeking unauthorized access to the computer of the broadband user. The threat of hackers, as well as the access to undesirable information has led to a large number of commercially available firewall solutions, which can be characterized as software-based or hardware-based. Unfortunately, both the current software-based and the current hardware-based approaches have associated disadvantages.

Software-based firewalls consist of software programs that monitor and protect network traffic at the central processing unit (CPU) level. Programs, such as BlackICE™, Zone Alarm®, and Norton™ Personal Firewall, have become increasingly popular. The disadvantages with using these programs are that they suffer from all of the normal installation, compatibility, and conflict issues associated and encountered with existing software programs. Also, although the programs are powerful and flexible in usage, they are difficult to configure, maintain, and update by the average user. A typical user installs a software firewall in a base configuration and then never reopens or adjusts any of the settings contained therein. To adjust a software firewall, for example in a Windows® based setting, a user must be familiar with the various software screens or windows and the settings in each window. The act of performing a software adjustment can be complicated and time consuming.

Hardware-based firewalls refer to software programs that are utilized and contained directly in a computer system modem. This is a significant advantage in that the hardware firewalls are essentially operational from the moment the modem is connected and activated. The hardware firewalls require little to no configuring to operate. The hardware firewalls can also support multiple computers, in a gateway or hub configuration.

However, hardware firewalls also have associated disadvantages, which include having default settings that preclude the use of peer-to-peer applications, such as multiplayer games. It is difficult for the average user to reconfigure a hardware firewall to accommodate these types of applications. To reconfigure a hardware firewall the user must know the Internet protocol (IP) address of the modem in order to access the modem configuration interface. The user must also know the specific values that need to be altered in the interface to appropriately alter the firewall.

Thus, there exists a need for an improved firewall system and method that allows for simple, easy, and quick adjustment of firewall settings.

DETAILED DESCRIPTION

Figure 1:
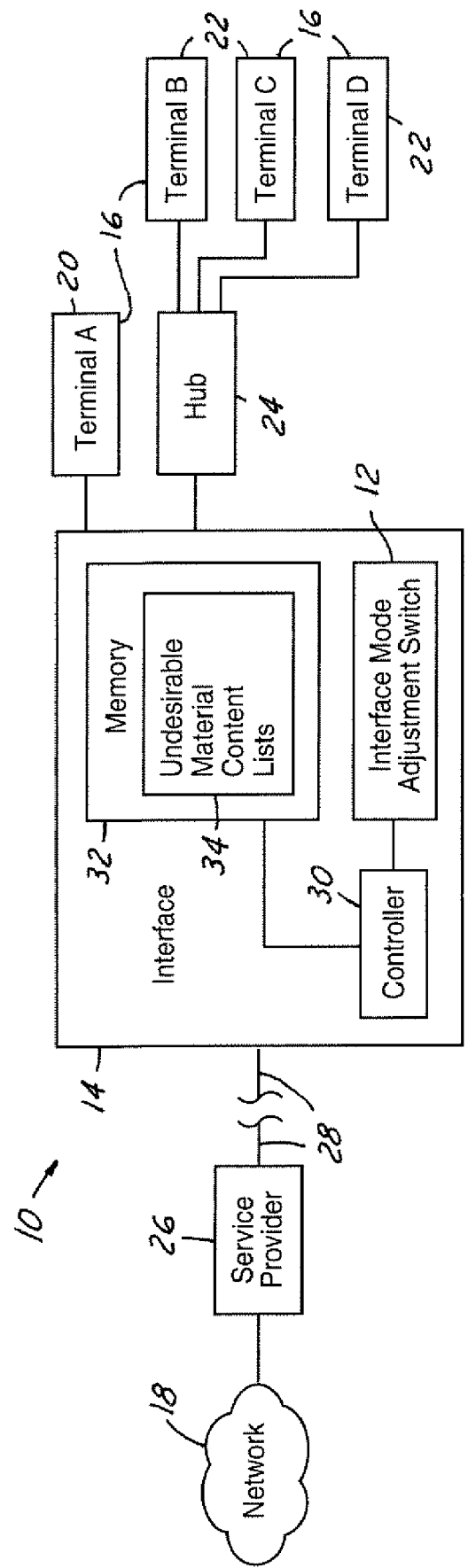
FIG. 1 is a block diagrammatic view of a material content setting adjustment system that utilizes a hardware-based interface mode adjustment switch in accordance with an embodiment of the present invention.

In each of the following figures, the same reference numerals are used to refer to the same components. While the present invention is described with respect to a system and method of adjusting operating mode of a firewall protection system and the passage of material content therethrough, the present invention may be adapted to be used in various communication systems known in the art. The present invention may be applied in applications, such as broadband modem applications, digital subscriber line (DSL) applications, cable applications, satellite communication applications, wireless communication applications, and analog communication applications. Also, the present invention may be applied at customer sites, within remote terminals, at central offices, at call centers, or at various other sites, terminals, or centers known in the art.

In the following description, various operating parameters and components are described for one constructed embodiment. These specific parameters and components are included as examples and are not meant to be limiting.

Also, the term "material content related information" may refer to keyword or pattern identification parameters, Internet address identification information, URL site identification parameters, packet headers, or other related information. The material content related information is used to identify undesirable material content or network sites that have or provide undesirable material content, such that passage of such material is prevented to the terminal of concern. For example, the site identifier associated with an Internet site that is known for containing undesirable spam material is considered material content related information.

Additionally, the term "terminal" may refer to a stand-alone computer or may refer to a computer access terminal that is coupled to a central computing station, such as a mainframe. A terminal may or may not have a central processing unit. A terminal may also refer to a main frame, a workstation, or other operating system known in the art.

The present invention provides a system and method for selectively determining passage level of material content within a communication system. A material content setting adjustment system includes a computer and an interface. The interface facilitates communication between the computer and a network. An interface mode adjustment switch has multiple physical operating mode positions. A controller is coupled to the interface mode adjustment switch. The controller selectively determines passage of material content between the computer and the interface in response to position of the interface mode adjustment switch.

The embodiments of the present invention provide several advantages. One such advantage is the provision of an interface mode adjustment switch that has multiple physical positions, which may be manually adjusted by a system user. The adjustment switch allows a user to easily and quickly adjust a firewall setting or material content passage level. The adjustment switch also provides visual indication of the state of a firewall at any moment in time.

Another advantage that is provided by multiple embodiments of the present invention is the provision of operating a controller of a material content setting adjustment system in a learning mode. In so doing, the controller is able to monitor the network activity to a computer and adjust the security level or passage of select material in response thereto. This further maintains a high level of security with a minimum level of user interaction.

Furthermore, the present invention is versatile in that it may be applied to various communication applications and may provide varying levels of firewall protection.

Referring now to FIG. 1, a block diagrammatic view of a material content setting adjustment system 10 that utilizes a hardware-based interface mode adjustment switch 12 in accordance with an embodiment of the present invention is shown. The material content system includes an interface 14 that is coupled between multiple user terminals 16 and a network 18. The interface 14 may be directly coupled to the terminals 16, as shown by terminal 20, or may be indirectly coupled to the terminals 16, as shown by terminals 22. The interface 14 is coupled to the terminals 22 via a hub 24. The interface 14 receives material content from the network 18 via a service provider 26. The interface 14 is coupled to the network 18 via a connection 28. The interface 14 includes the adjustment switch 12, which is coupled to a controller 30. The adjustment switch 12 is manually actuated by a user to adjust a current security operating level of the controller 30. The controller 30 contains firewall or material content filtering software that is used to prevent passage of undesirable material between the network 18 and the terminals 16.

The interface 14 determines whether to allow passage of the material content received from the network 18 to the terminals 16. The interface 14 may be in the form of a router, a modem, a gateway, a high-speed communication interface, or some other interface known in the art. The interface 14 may include the controller 30 and a memory 32. The memory 32 is coupled to the controller 30 and stores the material content related information. The controller 30 uses the material content related information in the determination of whether to allow passage of incoming material.

The memory 32 may be in the form of RAM or ROM and may be located within the interface 14, as shown, or may be located within the terminals 16, the hub 24, may be a separate stand alone device, or a combination thereof. The memory 32 contains undesirable material content lists 34. The lists 34 may have keywords, patterns, Internet address identifiers, specific Internet Protocols, Internet Ports, site identifiers, packet identifiers, or other undesirable information related identifiers known in the art. The lists 34 may be stored in various form, such as in tables, separate lists, trees, or in some other form known in the art.

The network 18 may be in the form of an Internet, an Intranet, an Extranet, or may be in some other network form known in the art. The network may be used to access the Internet and the World Wide Web (WWW).

The hub 24 may be in the form of a routing device that routes communication signals between the interface 14 and the terminals 16. The hub 24 may be in the form of a central computing or operating station, a mainframe, or other routing or central operating station known in the art. The hub 24 and the interface 14 may be integrally formed as a single unit or may be separate stand-alone units, as shown.

The service provider 26 may be an Internet service provider, a network service provider, or some other service provider known in the art. In an embodiment of the present invention, the service provider 26 is an Internet service provider and provides access to the Internet.

The connection 28 is used for communication between the interface 14 and the service provider 26. The connection 28 may be in the form of a wired or wireless connection. The connection 28 may be a high-speed communication connection, a DSL connection, a communications-unity antenna television connection, a satellite connection, a wireless connection, a broadband cable connection, an Internet connection, an analog connection, or other communication connection known in the art.

Figure 3:
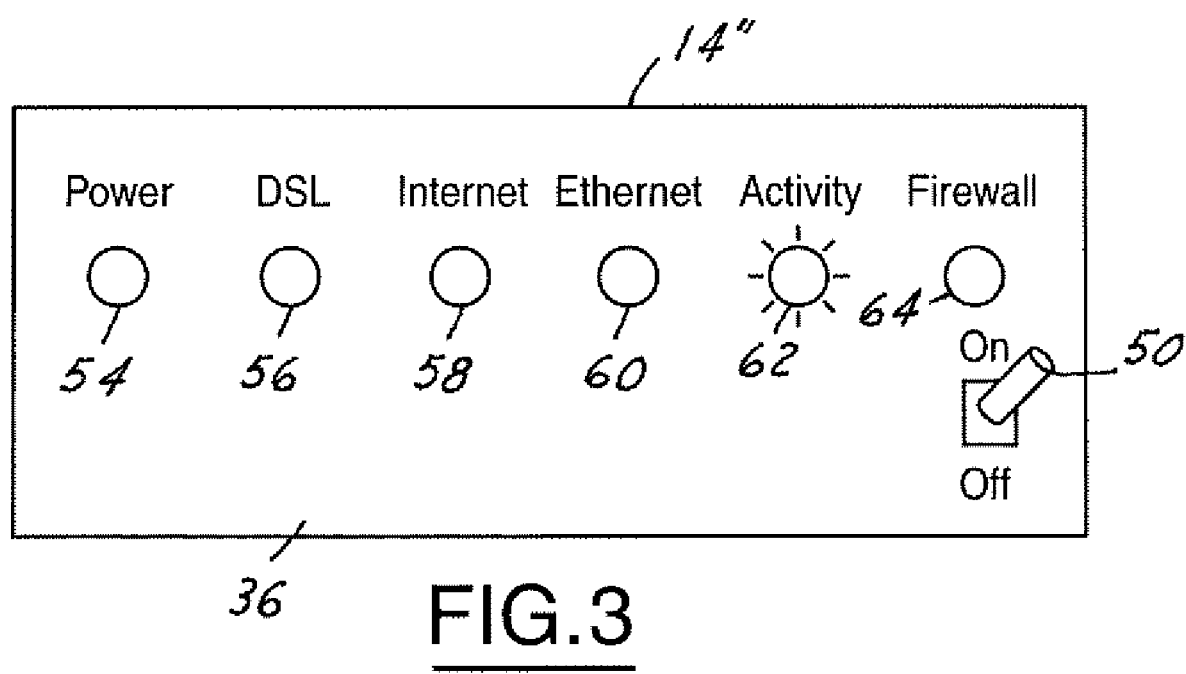
FIG. 3 is a front view of an interface illustrating a sample implementation of a binary interface mode adjustment switch in accordance with multiple embodiments of the present invention.
Figure 4:
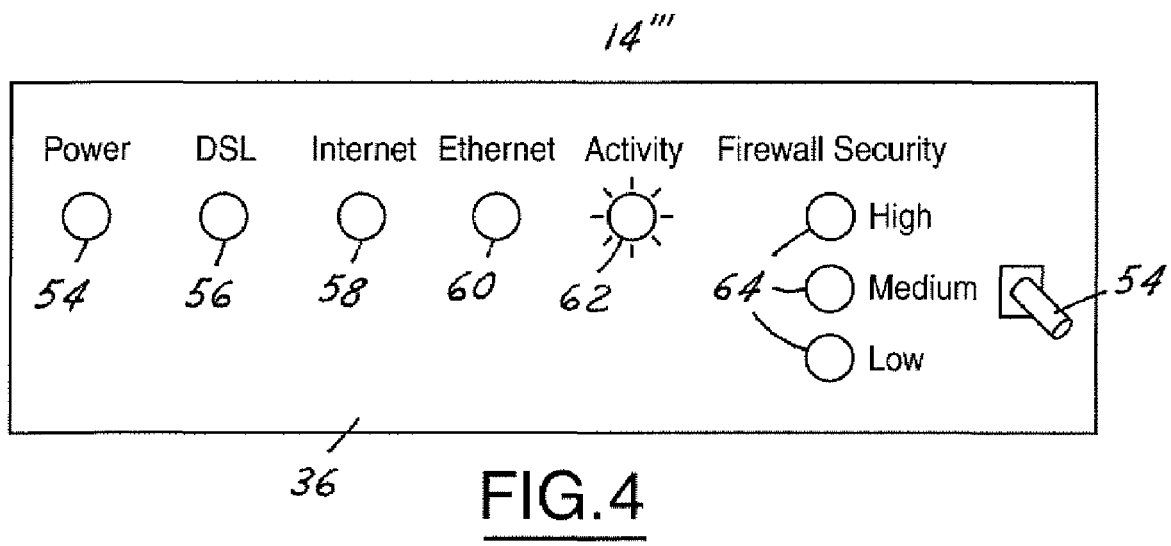
FIG. 4 is a front view of an interface illustrating a sample implementation of a multi-stage interface mode adjustment switch in accordance with multiple embodiments of the present invention.

The adjustment switch 12 is hardware-based and has multiple physical operating mode positions. In one embodiment of the present invention, the adjustment switch 12 is mounted on a housing 36, as best seen in FIGS. 3 and 4, of the interface 14 and is located proximate one or more of the terminals 16. A user may adjust the security level of the system 10 by actuating the adjustment switch 12. The adjustment switch 12 may be in the form of a toggle switch, a rotary switch, a push button switch, a rocker switch, a slide switch, a keylock switch, some other type of switch known in the art, or a combination thereof. The adjustment switch 12 may be mounted in the interface 14, as shown, in the terminals 16, or in various other housings known in the art.

The controller 30 may be microprocessor based such as a computer having a central processing unit, memory (RAM and/or ROM), and associated input and output buses. The controller 30 may be an application-specific integrated circuit or may be formed of other logic devices known in the art. The controller 30 may be a portion of a central control unit of the interface 14, as shown, of the terminals 16, of the hub 24, or may be a stand-alone controller. The controller 30 has multiple security level operating modes that correspond with the multiple positions of the adjustment switch 12.

Figure 2:
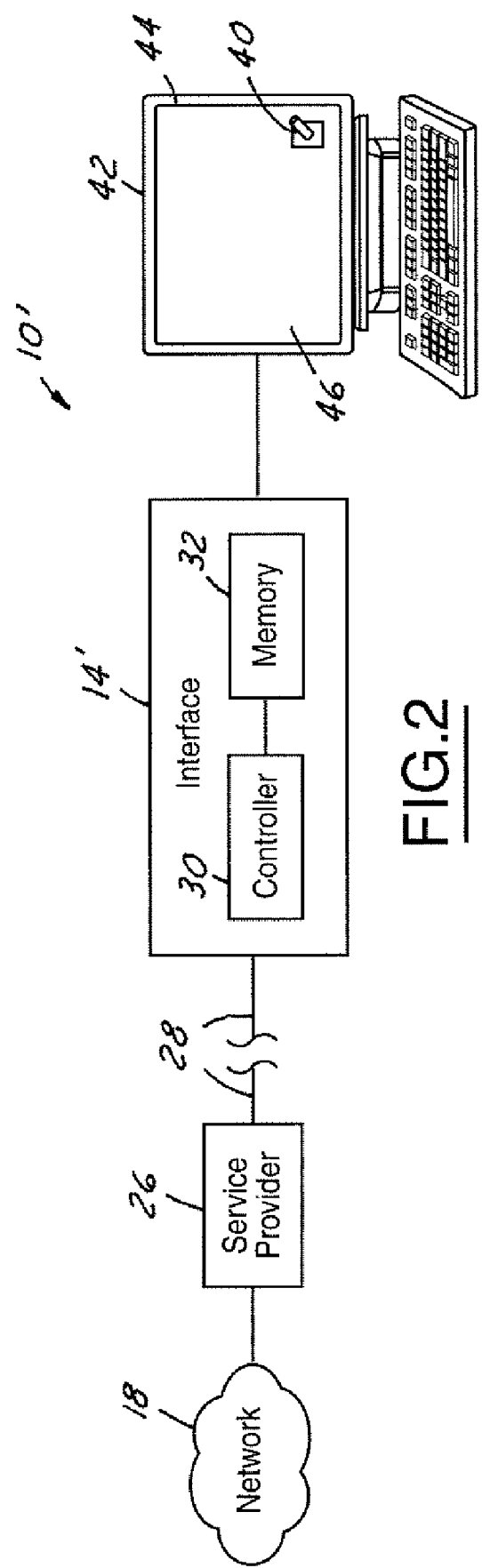
FIG. 2 is a block diagrammatic view of a material content setting adjustment system that utilizes a software-based interface mode adjustment switch in accordance with another embodiment of the present invention.

Referring now to FIG. 2, a block diagrammatic view of a material content setting adjustment system 10' that utilizes a software-based interface mode adjustment switch 40 in accordance with another embodiment of the present invention is shown. The adjustment system 10' includes an interface 14' that is coupled between a computer 42 and the service provider 26. The service provider 26 provides access to the network 18 for the computer 42. The computer 42 includes the software-based switch 40.

The software-based switch 40 is similar to the hardware-based switch 12 in that actuation or selection adjustment of the software-based switch 40 adjusts security level setting of the controller 30. The software-based switch 40 has multiple software-represented positions that are viewable via a monitor 44. Positions of the software-based switch 40 correspond to multiple security level operating modes of the controller 30 and may be continuously viewed on the monitor 44, such as on the software or computer system desktop 46. The software-based switch 40 may have onscreen representations that resemble a toggle switch, a rotary switch, a push button switch, a rocker switch, a slide switch, a keylock switch, some other type of switch known in the art, or a combination thereof. The software-based switch 40 may be accessed through a pull-down or pull-up window or through a designated icon.

Referring now to FIG. 1 and to FIGS. 3 and 4, which show front views of interfaces 14" and 14'" illustrating sample implementations of a binary interface mode adjustment switch 50 and of a multi-stage interface mode adjustment switch 52, respectively, in accordance with embodiments of the present invention. Although the switches 50 and 52 are shown in hardware form, they may be in software form and have similar positions or settings. The interfaces 14" and 14'" may have various indicators, such as a power indicator 54, a digital subscriber line indicator 56, an Internet indicator 58, an Ethernet indicator 60, and an activity indicator 62, and a firewall or firewall security indicator 64, as well as other indicators known in the art.

In the embodiment of FIG. 3, the binary switch 50 has two positions that correspond to a firewall activated mode and a firewall deactivated mode. The activated mode or blocking mode refers to when the firewall software is active and is being used to prevent passage of undesirable material content between the network 18 and the terminals 16. The deactivated mode or non-blocking mode refers to when the firewall software is inactive and is not being used to prevent passage of undesirable material.

In the embodiment of FIG. 4, the multi-stage switch 52 has three positions that correspond to a firewall activated mode, a learning mode, and a firewall deactivated mode. The activated and deactivated modes for the multi-stage switch 52 are similar to the activated and deactivated modes of the binary switch 50. The learning mode refers to when the controller 30 is "learning" or adjusting content of the undesirable material content lists 34 according to activity between a terminal 16 and a network 18, such as activity between user selected sites and a computer. The learning mode is described in further detail below in the method of FIG. 5.

The power indicator 54 illuminates when the interface 14 receives power. The digital subscriber line indicator 56, the Internet indicator 58, and the Ethernet indicator 60 illuminate, respectively, when communication is being performed via a DSL line (not shown), with the Internet, or via an Ethernet connection (also not shown). The activity indicator 62 illuminates when there is communication activity between the service provider 26 and at least one of the terminals 16. The firewall indicator 64 indicates a current security level of the interface 14. Any number of the above-stated indicators may be utilized. The indicators 54, 56, 58, 60, 62, and 64 may be in various shapes, styles, and forms.

Although the switches 50 and 52 are shown as having a set number of positions, the switches utilized by the various embodiment of the present invention may have any number of positions, associated operating modes, and corresponding levels of security.

Figure 5:
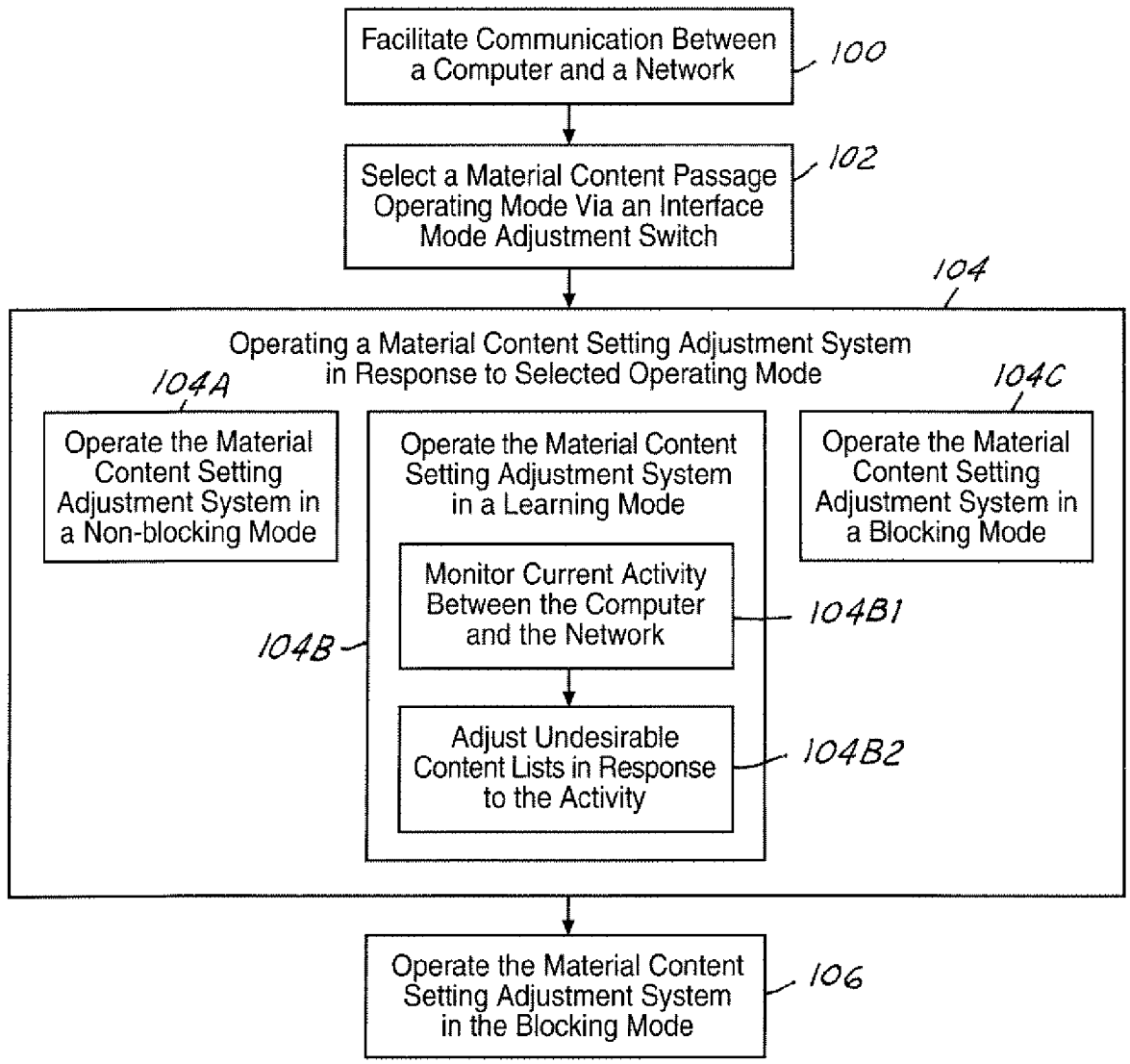
FIG. 5 is a logic flow diagram illustrating a method of adjusting passage of material content within a communication system in accordance with an embodiment of the present invention.

Referring now to FIG. 5, a logic flow diagram illustrating a method of adjusting passage of material content within a communication system in accordance with an embodiment of the present invention is shown. Although the method of FIG. 5 is described primarily with respect to the embodiments of FIGS. 1 and 4, the method may be easily modified for other embodiments of the present invention.

In step 100, the interface 14 facilitates communication between the terminals 16 and the network 18. The interface 14 allows the terminals 16 to communicate with the network 18 by providing appropriate signal conversions. The interface 14 may convert digital signals to analog signals and vice versa.

In step 102, a security level or material content passage operating mode is selected by the physical position of the switch 12. The selected security level corresponds with a certain desired level of filtering the material content. The user may adjust the operating mode by adjusting the position of the switch 12. The user may select from any number of operating modes. In the example embodiment of FIG. 5, the user may select from a blocking mode (a high security level mode), a learning mode (a medium security level operating mode), or a non-blocking mode (a low security level operating mode), which are further described in the following steps. When the switch 12 is software-based the user may select, adjust, or actuate the switch via a keyboard, a mouse, a touch screen, or by some other input device known in the art.

In step 104, the controller 30 operates in the selected mode in response to the position of the switch 12. The controller 30 determines the passage of material content between the network 18 and the terminals 16 in response to the selected mode.

In step 104A, the controller 30 operates in the non-blocking mode. The controller 30 allows the passage of a majority of information between the terminals 16 and the network 18. The controller 30 may not allow, for example, passage of information that is deemed to be virus related or information that may damage or hinder system operation.

In step 104B, the controller 30 operates in the learning mode. In the learning mode the firewall software is being utilized in a non-blocking or partially blocking fashion, such that the user is able to receive the material content from selected sites without the filtering thereof. The terminal 16 may receive information from the selected sites that may normally be considered undesirable. For example, the terminals 16 may have access to peer-to-peer applications. The controller 30 may remain in the learning mode indefinitely, until the user selects a different operating mode, or for a predetermined length of time. By incorporation of the learning mode, the user is able to reduce the security level for specific tasks without the user being required to adjust software settings within the interface 14.

In step 104B1, the controller 30 monitors system activity by the user and between the terminals 16 and the network 18. In step 104B2, the controller 30 adjusts the contents of the undesirable material content lists 34 in response to the monitored activity. The controller 30 adjusts the lists 34 to allow activity from the selected sites or ports in the future when operating in the blocking mode.

In step 104C, the controller 30 operates in the blocking mode. The controller 30 filters information that corresponds to the material contained in the lists 34. The controller 30 allows passage of the material corresponding to the sites or ports having activity, as determined in step 104B.

In step 106, which is similar to step 104C, the controller 30 may be returned to the activated or blocking mode by lapse of the predetermined length of time or by actuation of the switch 12. The controller 30 "leaves open" or allows communication with the ports that were used during the learn mode, these ports are now considered desirable.

The above-described steps are meant to be an illustrative example; the steps may be performed sequentially, simultaneously, synchronously or in a different order depending upon the application.

The present invention provides an efficient and easy system and method for adjusting a firewall security level without the need for manually modifying multiple software settings. The present invention minimizes costs associated with support calls that regard the configuring and reconfiguring of firewalls. The present invention allows a user to self configure a firewall without the need for a high level understanding of interface and firewall operation.

The above-described system, to one skilled in the art, is capable of being adapted for various purposes and is not limited to control systems or other communication systems. The above-described invention may also be varied without deviating from the spirit and scope of the invention as contemplated by the following claims.

The invention claimed is:

1. A material content setting adjustment system comprising:
   at least one computer;
   at least one interface facilitating communication between said at least one computer and a network;
   at least one interface mode adjustment switch having a plurality of physical operating mode positions corresponding to the plurality of modes of a controller, wherein said controller is coupled to said at least one interface mode adjustment switch and selectively determining passage of material content between said at least one computer and said at least one interface in response to physically selected position of said at least one interface mode adjustment switch, wherein the at least one interface mode adjustment switch is dedicated for use with the controller to selectively determine passage of material content, the controller operable in a learning mode to selectively adjust content of an undesirable material content list according to monitored user activity, the learning mode selectable by the at least one interface mode adjustment switch; and wherein said controller is further operable in operating modes selected from at least one of a blocking mode, a partially blocking mode and a non blocking mode.

2. The system of claim 1 wherein said at least one interface is an Interface selected from at least one of a gateway, a hub, a high-speed communication interface, and a router.

3. The system of claim 1 wherein said controller is contained at least partially within said at least one computer.

4. The system of claim 1 wherein said controller is contained at least partially within said at least one interface.

5. The system of claim 1 wherein said plurality of operating mode positions correspond with a plurality of operating modes of said controller.

6. The system of claim 1 wherein said at least one interface mode adjustment switch has a firewall activated position and a firewall deactivated position.

7. The system of claim 1 wherein said interface is coupled to said network via a connection selected from at least one of a high-speed communication connection, a digital subscriber line connection, a communications-unity antenna television connection, a satellite connection, a wireless connection, a broadband cable connection, analog connection, and an Internet connection.

8. The system of claim 1 wherein said at least one interface mode adjustment switch is a switch selected from at least one of a toggle switch, a rotary switch, a push button switch, a rocker switch, a slide switch, and a keylock switch.

9. The system of claim 1 wherein said at least one interface mode adjustment switch is hardware-based.

10. The system of claim 1 wherein said at least one interface mode adjustment switch is mounted in at least one of said at least one computer, said at least one interface, and at least one housing.

11. A material content setting adjustment system comprising:
    at least one computer;
    at least one interface facilitating communication between said at least one computer and a network;
    at least one interface mode adjustment switch having a plurality of physical operating mode selections comprising a learning mode selection; and
    a controller coupled to said at least one interface mode adjustment switch, having a plurality of operating mode selections, and selectively determining passage of material content between said at least one computer and said at least one interface in response to said plurality of physical operating mode selections, wherein in the learning mode the controller is able to selectively adjust content of an undesirable material content list according to monitored user activity; wherein further said controller is operable in operating modes selected from at least one of a blocking mode, a partially blocking mode and a non blocking mode.

12. The system of claim 11 wherein said at least one interface mode adjustment switch is software actuated.

13. The system of claim 11 wherein said plurality of operating mode positions have an onscreen representation.

14. The system of claim 11 wherein status of said at least one interface mode adjustment switch is continuously shown on said at least one computer desktop.

15. A method of adjusting passage of material content within a communication system comprising:
    facilitating communication between at least one computer and a network via at least one interface;
    selecting a material content passage operating mode via at least one physical interface mode adjustment switch, said at least one physical interface mode adjustment switch being coupled to a controller and having a plurality of physical mode selections that are dedicated for use with said controller in selecting the material content passage operating mode, wherein at least one selectable material content passage operating mode of said controller is a learning mode in which said controller is operable to selectively adjust content of an undesirable material content list according to monitored user activity; and
    determining passage of material content between said at least one computer and said at least one interface in response to said selected material content passage operating mode wherein said controller is further operable in operating modes selected from at least one of a blocking mode, partially blocking mode and a non-blocking mode.

16. The method of claim 15 further comprising:
    selecting a learning mode; and learning allowable material content.

17. The method of claim 16 wherein learning allowable material content comprises operating in a non-blocking mode or a partially blocking mode.

18. The method of claim 16 wherein leaning allowable material content is performed for a predetermined length of time.

19. The system of claim 1, wherein the controller remains in the learning mode for a predetermined length of time.

20. The system of claim 11, wherein the controller remains in the learning mode for a predetermined length of time.

21. The method of claim 15, further comprising remaining in the learning mode for a predetermined length of time.

* * * * *